UNITED STATES PATENT OFFICE.

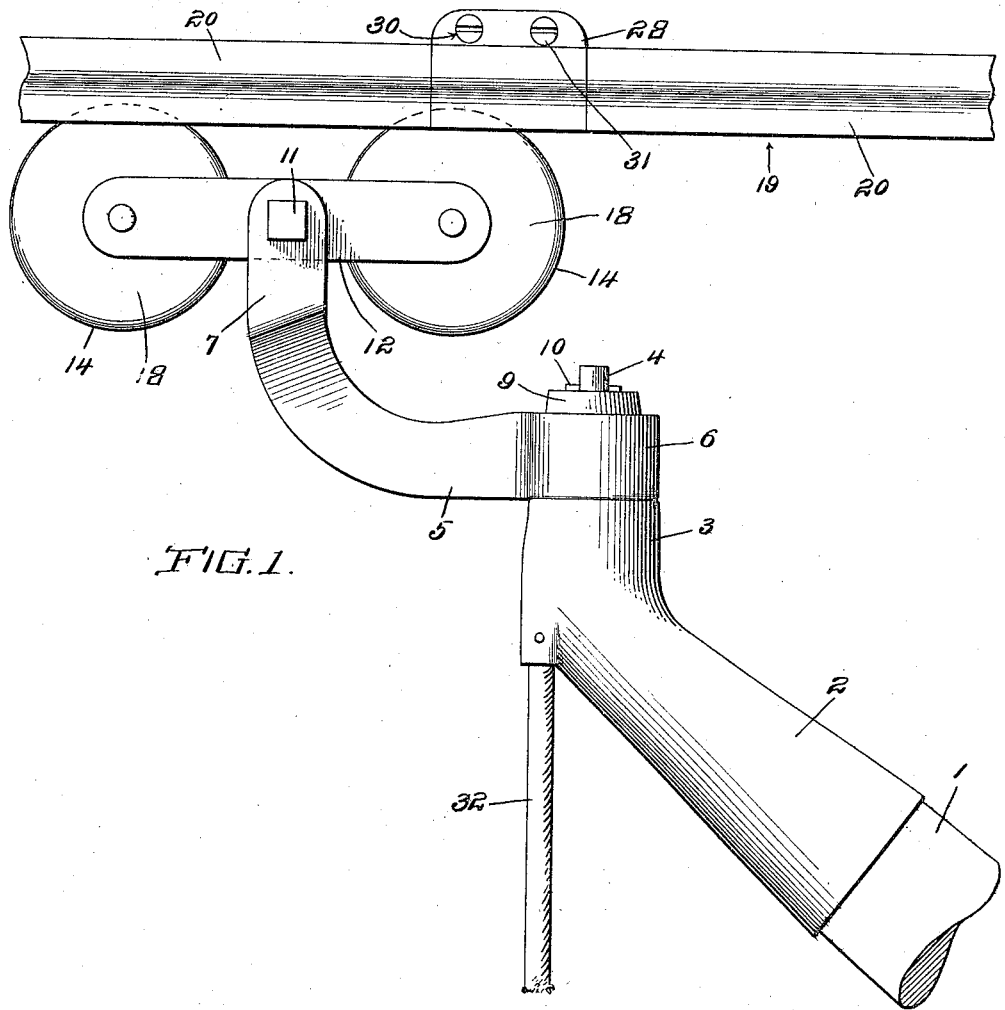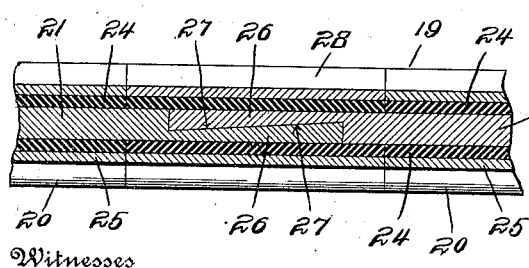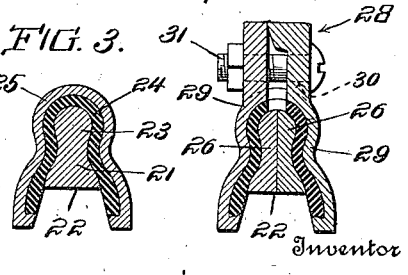

JOSIP OZANICH, OF SUNNYSIDE, UTAH.

TROLLEY-CONDUCTOR.

1,181,477.  Specification of Letters Patent.  Patented May 2, 1916.

Application filed August 7, 1915. Serial No. 44,359.

*To all whom it may concern:*

Be it known that I, JOSIP OZANICH, a citizen of the United States, residing at Sunnyside, in the county of Carbon and State of Utah, have invented new and useful Improvements in Trolley-Conductors, of which the following is a specification.

This invention relates to improvements in trolley wheels and conductors.

In carrying out the present invention, it is my purpose to provide a combination of trolley wheel and conductor whereby the use of the usual grooved trolley wheel will be eliminated and the trolley wheel held in engagement with the conductor.

It is also my purpose to provide a trolley conductor which will be protected against rain, snow and ice and which will be formed of sections capable of being readily assembled in trolley conductor formation and disassembled.

Another object of my invention is to provide a trolley wheel and bracket therefor whereby the wheel may swing relatively to the trolley pole so as to follow curves and other irregularities in the conductor.

With the above and other objects in view, the invention consists in the construction, combination and arrangement of parts hereinafter set forth in and falling within the scope of the claim.

In the accompanying drawings; Figure 1 is a view in side elevation of a trolley conductor, trolley wheel and bracket for such wheel, the conductor, wheel and bracket being constructed in accordance with the present invention. Fig. 2 is a fragmentary longitudinal sectional view through the conductor. Fig. 3 is a cross sectional view therethrough. Fig. 4 is a similar view through the joint between the sections of the conductor.

Referring now to the drawings in detail, 1 designates the upper portion of the trolley pole, the lower end of such pole being connected to the top of a car in the usual well known manner. Mounted upon the upper end of the pole 1 and suitably secured thereto is a horn 2 arranged coaxial with the trolley pole. Formed on the upper end of the horn 2 and projecting upwardly therefrom at an angle to such horn is a head block 3 adapted to be arranged in a vertical position when the trolley pole is elevated. Secured to the upper end of the head block 3 and projecting upwardly therefrom is an axial pivot post 4.

5 designates a curved arm having one end formed with a head 6 and the opposite end forked or bifurcated as at 7. The head 6 is formed centrally with an opening 8 that receives the pivot post 4 whereby the arm 5 may be pivotally connected to the head block 3. Surrounding the pivot post 4 and resting upon the upper end of the head 6 is a washer 9, while passed through a transverse opening in the pivot post is a securing pin 10 acting to hold the washer and the head on the post. The forked end 7 of the arm 5 projects upwardly and passed through alining openings in the limbs of the forked extremity of the curved arm is a horizontal pivot pin 11. Pivoted between its ends upon the pin 11 is a bar 12 having the end portions thereof beyond the forked extremity 7 of the arm 5 bifurcated and journaled in the bifurcated ends of the bar 12 are trolley wheels 14.

19 designates my improved trolley conductor as an entirety. This conductor is formed of a number of sections 20 and each section comprises a current carrying wire 21 having the bottom surface flattened as at 22 and the upper portion semicircular in cross section as at 23 and merging into the lower portion. Surrounding the top and sides of the wire 21 is a cover of insulating material 24 of cross sectional configuration corresponding to that of the wire, while inclosing the insulating covering 24 is a metal casing 25 of a cross sectional shape corresponding to that of the covering 24 on the wire 21. The lower edges of the side walls of the casing 25 depend below the flat surface 22 of the wire and are spaced apart in parallelism along the length of the wire to form guides and protect the bottom surface of the wire against rain, snow, ice or the like. The extremities of the wire 21 of each section project beyond the ends of the covering 24 and the casing 25 and the projecting end portions of the wire are formed with outwardly projecting oppositely disposed tongues 26 adapted to lie in face to face contact with the tongues of the adjacent sections and the confronting faces of corresponding tongues are beveled in relatively opposite directions as at 27 so that the tongues will nicely interfit.

Embracing the projecting ends of adjacent sections and the interfitting tongues on such ends is a clamp 28 comprising companion sections 29 placed face to face and having the upper portions thereof formed with alining bolt holes 30 through which are passed securing bolts 31 whereby the sections may be held in clamp formation. The confronting faces of the sections 29 below the bolted portions are cut out to conform to the cross sectional configuration of the tongues and wires of the trolley conductor and clamp such tongues to hold the same in proper relative positions so that the sections 20 may be held in conductor formation.

In practice, the tongues on the adjoining ends of the sections are secured together by means of the clamps 28 and the trolley conductor suitably supported above the track. The lower edges of the sections of the clamp project beyond the bottom edges of the tongues and form, in effect, continuations of the depending sides of the metal casing 25. When the trolley pole on the car is elevated, the peripheries of the trolley wheels 14 engage the flattened surface of the trolley conductor 19 and in the travel of the car the depending sides of the casing 25 hold the wheels in engagement with the trolley wire and guide such wheels so as to prevent jumping of the trolley wheels from the wire. The bar 12 carrying the trolley wheels swings about the pivot pin 11 whenever the wheels encounter any irregularities in the flat surface of the trolley wire so that accidental displacement of the wheel will be avoided, while when the car rounds a curve or the like the arm 5 swings about the pivot post 4, thereby enabling the wheels to hold to the wire and the pole to move with the car.

One end of a rope or the like 32 is fastened to the head block 3 while the remaining end is disposed within convenient reach of the operator of the car so that the trolley pole may be readily lowered and elevated.

From the foregoing description taken in connection with the accompanying drawings, the construction, mode of operation and manner of employing my invention will be readily apparent. It will be seen that I have provided a trolley conductor and trolley wheel which are so correlated and arranged as to hold the wheels in engagement with the wire without grooving the peripheries of the wheels, while the trolley pole may be moved relatively to the wire when rounding curves and the like without affecting the position of the trolley wheel on the conductor.

While I have herein shown and described one preferred form of my invention by way of illustration, I wish it to be understood that I do not limit or confine myself to the precise details of construction herein described and delineated, as modification and variation may be made within the scope of the claim without departing from the spirit of the invention.

I claim:

A trolley conductor having a flat lower side and formed of a number of sections, tongues formed on the adjoining ends of adjacent sections and adapted to interfit, a casing embracing said top and sides of said conductors and having the sides thereof depending below the flat surface of said conductor, said casing being divided into sections having the ends thereof terminating adjacent to the interfitting tongues, and a two-part clamp embracing the top and sides of said conductor at the interfitting tongues therein and constructed to form continuations of the sections of said casing.

In testimony whereof I affix my signature in presence of two witnesses.

JOSIP OZANICH.

Witnesses:
LUKA PANIAN,
MARTIN GREGURISH.

Copies of this patent may be obtained for five cents each, by addressing the "Commissioner of Patents, Washington, D. C."